US009652137B2

United States Patent
Guan et al.

(10) Patent No.: US 9,652,137 B2
(45) Date of Patent: May 16, 2017

(54) METHOD AND DEVICE FOR CONFIRMING AND EXECUTING PAYMENT OPERATIONS

(71) Applicant: Tencent Technology (Shenzhen) Company Limited, Shenzhen (CN)

(72) Inventors: Yabei Guan, Shenzhen (CN); Hang Zhou, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 392 days.

(21) Appl. No.: 14/455,748

(22) Filed: Aug. 8, 2014

(65) Prior Publication Data

US 2015/0120554 A1 Apr. 30, 2015

Related U.S. Application Data

(63) Continuation of application No. PCT/CN2014/077151, filed on May 9, 2014.

(30) Foreign Application Priority Data

Oct. 31, 2013 (CN) .......................... 2013 1 0535773

(51) Int. Cl.
*G06Q 40/00* (2012.01)
*G06F 3/0484* (2013.01)
(Continued)

(52) U.S. Cl.
CPC ........ *G06F 3/04847* (2013.01); *G06F 3/0486* (2013.01); *G06F 3/0488* (2013.01);
(Continued)

(58) Field of Classification Search
CPC .. G06Q 30/0238; G06Q 20/20; G06Q 20/387; G06Q 30/0235; G06Q 30/0207;
(Continued)

(56) References Cited

U.S. PATENT DOCUMENTS 6,464,146 B2 10/2002 Ito et al.
7,720,770 B1 * 5/2010 Morimoto .............. G06Q 30/06
705/80

(Continued)

FOREIGN PATENT DOCUMENTS

CN 101819662 A 9/2010
TW 201019241 A 5/2010

OTHER PUBLICATIONS

AuthenTec brings power of touch features to new fingerprint-enabled windows CE phone in china. (Nov. 17, 2008). Business Wire Retrieved from https://dialog.proquest.com/professional/professional/docview/678584713?accountid=142257 on Mar. 1, 2017.*

(Continued)

*Primary Examiner* — Kito R Robinson
(74) *Attorney, Agent, or Firm* — Morgan, Lewis & Bockius LLP

(57) ABSTRACT

A method and device for providing one-step payment approval and confirmation are disclosed. The device concurrently displays a data entry region and a confirmation region in a user interface of the device, where the data entry region is to accept user entry of payment data associated with a payment operation and the confirmation region is to require a sliding input to cause execution of the payment operation. While displaying the data entry region containing payment data received from a user, the device detects a user input in the confirmation region of the user interface. The device determines, in accordance with a predetermined criterion, whether the detected user input qualifies as a sliding input that follows a predefined motion path. Upon determining that the detected user input qualifies as the required sliding input, the electronic device executes the
(Continued)

payment operation in accordance with the received payment data.

19 Claims, 8 Drawing Sheets

(51) Int. Cl.
*G06F 3/0488* (2013.01)
*G06Q 20/40* (2012.01)
*G06F 3/0486* (2013.01)
*G06F 3/0481* (2013.01)
*H04M 15/28* (2006.01)
*H04M 15/00* (2006.01)
*G06Q 30/02* (2012.01)

(52) U.S. Cl.
CPC ...... *G06F 3/04817* (2013.01); *G06F 3/04842* (2013.01); *G06Q 20/4014* (2013.01); *H04M 15/28* (2013.01); *H04M 15/48* (2013.01); *H04M 15/83* (2013.01); *H04M 15/846* (2013.01); *H04M 15/858* (2013.01); *G06Q 30/0207* (2013.01); *G06Q 30/0211* (2013.01); *G06Q 30/0217* (2013.01); *G06Q 30/0221* (2013.01); *G06Q 30/0222* (2013.01); *G06Q 30/0235* (2013.01); *G06Q 30/0236* (2013.01); *G06Q 30/0238* (2013.01); *G06Q 30/0267* (2013.01)

(58) Field of Classification Search
CPC ........... G06Q 30/0222; G06Q 30/0217; G06Q 30/0236; G06Q 30/0221; G06Q 30/0225; G06Q 30/0211; G06Q 30/0267; G06Q 30/0631
USPC .......................................................... 705/44
See application file for complete search history.

(56) References Cited

U.S. PATENT DOCUMENTS

| | | | | |
|---|---|---|---|---|
| 8,364,590 B1* | 1/2013 | Casey | ............... | G06Q 20/3221 705/35 |
| 9,275,389 B1* | 3/2016 | Dides | .................. | G06Q 20/405 |
| 2008/0027795 A1* | 1/2008 | Medlin | ................. | G06Q 20/20 705/14.14 |
| 2011/0029400 A1* | 2/2011 | Scipioni | .................. | G06F 21/36 705/26.4 |
| 2011/0189981 A1* | 8/2011 | Faith | ..................... | G06F 1/1694 455/414.1 |
| 2011/0208852 A1* | 8/2011 | Looney | .................. | G06Q 30/06 709/223 |
| 2011/0251954 A1 | 10/2011 | Chin | | |
| 2011/0282785 A1 | 11/2011 | Chin | | |
| 2012/0062471 A1* | 3/2012 | Poulidis | .............. | H04N 5/4403 345/173 |
| 2012/0313882 A1* | 12/2012 | Aubauer | ................. | G06F 3/046 345/174 |
| 2014/0081800 A1* | 3/2014 | Liu | .................... | G06Q 30/0631 705/26.7 |
| 2014/0089201 A1* | 3/2014 | Jakulin | .............. | G06Q 20/1235 705/64 |
| 2014/0181956 A1* | 6/2014 | Ahn | ........................ | G06F 21/46 726/18 |
| 2014/0195968 A1* | 7/2014 | Banavara | ........... | G06Q 30/0641 715/810 |
| 2014/0232642 A1* | 8/2014 | Lefebvre | ................. | G06F 3/017 345/156 |
| 2014/0337781 A1* | 11/2014 | Bastide | ................. | G06F 3/0484 715/771 |
| 2015/0161212 A1* | 6/2015 | Yang | ................. | G06F 17/30867 707/722 |
| 2015/0178757 A1* | 6/2015 | Moshal | ............. | G06F 17/30879 705/14.26 |
| 2015/0213448 A1* | 7/2015 | Subbaraj | ............ | G06Q 20/4014 705/40 |

OTHER PUBLICATIONS

Bank of the west breaks new ground in mobile banking with quick balance, the fastest and easiest way to check account balances. (Apr. 3, 2013). PR Newswire Retrieved from https://dialog.proquest.com/professional/professional/docview/1323829702?accountid=142257 on Mar. 1, 2017.*

AuthenTec brings touch-powered user features to new smart phone. (Jun. 17, 2009). Business Wire Retrieved from https://dialog.proquest.com/professional/professional/docview/680663752?accountid=142257 on Mar. 1, 2017.*

Tencent Technology, ISRWO, PCT/CN2014/077151, Aug. 20, 2014, 7 pgs.

Tencent Technology, IPRP, PCT/CN2014/077151, May 3, 2016, 5 pgs.

* cited by examiner

500

Concurrently display, in a user interface of an electronic device, a data entry region configured to accept user entry of payment data associated with a payment operation and a confirmation region configured to require a sliding input that follows a predefined motion path to cause execution of the payment operation
502

Receive, in response to a user operating the data entry region of the user interface, the payment data associated with the payment operation
504

Detect a user input in the confirmation region of the user interface while displaying the data entry region containing the received payment data in the user interface
506

Determine, in accordance with a predetermined criterion, whether the detected user input qualifies as the sliding input that follows the predefined motion path
508

Upon determining that the detected user input qualifies as the required sliding input, execute the payment operation in accordance with the received payment data
510

Figure 5

METHOD AND DEVICE FOR CONFIRMING AND EXECUTING PAYMENT OPERATIONS

RELATED APPLICATIONS

This application is a continuation application of PCT Patent Application No. PCT/CN2014/077151, entitled "Method and Device for Confirming and Executing Payment Operations" filed on May 9, 2014, which claims priority to Chinese Patent Application Serial No. 201310535773.5, entitled "Method and Apparatus for Confirming Operation Execution", filed on Oct. 31, 2013, both of which are incorporated herein by reference in their entirety.

TECHNICAL FIELD

The present application generally relates to the field of terminal device technologies, and more particularly to a method and device for providing confirmation for operation execution (e.g., a one-step payment confirmation and execution service) at terminal devices.

BACKGROUND

With the development of networking technologies, online shopping has been enabled by online payment systems. In order to reduce economic loss of users caused by insufficient consideration or operation mistakes during online shopping, some known online payment systems require a confirmation on payment information before a user can execute a payment operation. Specifically, to confirm the execution of a payment operation, such online payment systems typically provide an extra user interface (e.g., a dialogue box, a pop-up window, a webpage, etc.) for the user to review and confirm the payment information and the intention to execute the payment operation. For example, after a user enters and submits payment information in a first webpage, a confirmation webpage containing the previously entered payment information is presented to the user for review and confirmation. After the user clicks a submit button in the confirmation webpage presenting the previously entered payment information, the payment information and the user's intention to execute the payment operation is considered confirmed, and as a result, the payment operation is executed.

Such an extra user interface provided by the known online payment systems, however, causes inconvenience and disrupts the continuity of a payment process, thus may negatively impact the user experience with the online payment operation. Accordingly, a need exists for a method and device that can provide a more efficient and convenient online payment process, resulting in a smoother user experience with online shopping.

SUMMARY

The above deficiencies associated with the known online payment systems may be reduced or eliminated by the techniques described herein.

In one aspect, a method of providing one-step payment approval and confirmation is performed at a user device with one or more processors and memory. The method includes concurrently displaying, in a user interface of the user device, a data entry region and a confirmation region. The data entry region is used to accept user entry of payment data associated with a payment operation. The confirmation region is used to require a sliding input that follows a predefined motion path to cause execution of the payment operation. The method includes receiving, in response to a user operating the data entry region of the user interface, the payment data associated with the payment operation. The method also includes detecting a user input in the confirmation region of the user interface while displaying the data entry region containing the received payment data in the user interface. The method further includes determining, in accordance with a predetermined criterion, whether the detected user input qualifies as the sliding input that follows the predefined motion path; and upon determining that the detected user input qualifies as the required sliding input, executing the payment operation in accordance with the received payment data.

In some instances, to determine whether the detected user input qualifies as the sliding input that follows the predefined motion path, the method includes determining whether (1) a starting point of the detected user input matches a predefined starting location of the predefined motion path, (2) an end point of the detected user input matches a predefined end location of the predefined motion path, and/or (3) a motion path of the detected user input matches a path of the predefined motion path.

In some embodiments, an electronic device includes one or more processors and memory storing one or more programs for execution by the one or more processors. The one or more programs include instructions for performing the operations of the method described herein. In some embodiments, a non-transitory computer readable storage medium stores one or more programs including instructions for execution by an electronic device with one or more processors. The instructions, when executed by the electronic device, cause the electronic device to perform the operations of the method described herein.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

FIG. 5 is a flowchart diagram of a method for performing an online payment process in accordance with some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
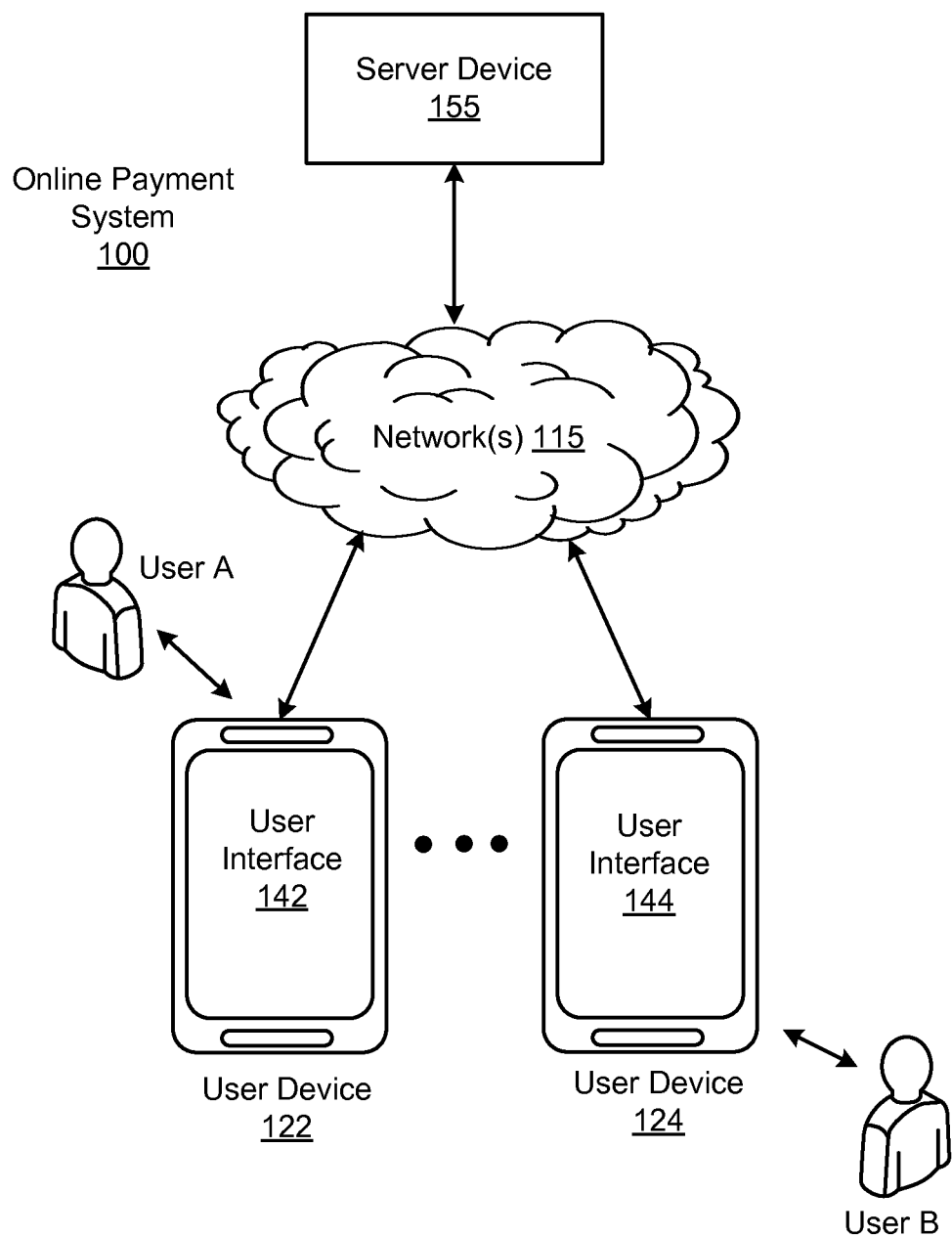
FIG. 1 is a schematic diagram that illustrates a server-client environment for an online payment system in accordance with some embodiments.

FIG. 1 is a schematic diagram that illustrates an exemplary server-client environment for an exemplary online payment system 100 in accordance with some embodiments. As shown in FIG. 1, the online payment system 100 includes a server device 155, a user device 122 operated by a user A, and a user device 124 operated by a user B. The server device 155 is operatively coupled to the user devices 122, 124 via one or more networks 115. In some embodiments, although not shown in FIG. 1, the online payment system 100 can include less or more than two user devices similar to the user devices 122, 124, and/or two or more server devices similar to the server device 155.

In some embodiments, the network(s) 115 include any network that operatively couples one or more server devices (e.g., the server device 155) to one or more user devices (e.g., the user devices 122, 124), and enables communications between the server device(s) and the user device(s). In some embodiments, the network(s) 115 include, for example, a local area network (LAN), a wide area network (WAN), a wireless local area network (WLAN), etc. Particularly, in some embodiments, the network(s) 115 include the Internet. The network(s) 115 are, optionally, implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

In some embodiments, the server device 155 is any device configured to communicate with and provide an online payment service to one or more user devices (e.g., the user devices 122, 124) via the network(s) 115. In some embodiments, the server device 155 can be, for example, a background server, a back end server, a workstation, a desktop computer, a cloud computing server, a data processing server, and/or the like. In some embodiments, the server device 155 can be a server cluster consisting of two or more servers.

In some embodiments, each user device 122, 124 is an electronic device configured to communicate with a server device (e.g., the server device 155) and provide a one-step online payment confirmation service to a user (e.g., the user A, the user B) operating that electronic device. In some embodiments, each of the user devices 122, 124 can be, for example, a smart phone, a personal digital assistant (PDA), a tablet computer, a laptop computer, a desktop computer, etc. For example, the user device 122 can be a smart phone (e.g., an iPhone®) operated by the user A. For another example, the user device 124 can be a desktop computer (e.g., a HP® Pavilion desktop computer) operated by the user B.

Each user device included in the online payment system 100 can be configured to display a user interface (e.g., on a display of that user device such as a monitor, a screen, etc.), via which a user can operate and interact with that user device. As shown in FIG. 1, for example, the user device 122 (e.g., a smart phone) can display a user interface 142 on a touch screen of the user device 122, via which the user A can operate the user device 122 by using, for example, user A's fingers or a stylus; the user device 124 (e.g., a desktop computer) can display a user interface 144 on a monitor of the user device 124, via which the user B can operate the user device 124 by using, for example, a mouse, a touchpad, and/or a keyboard. Furthermore, as discussed above, the user devices 122, 124 can be operatively coupled to and communicate with the server device 155 via the network(s) 115 using any suitable wired and/or wireless communication protocol. Thus, each user device 122 or 124 and the server device 155 can collectively perform an online payment process for the user operating that user device. Details of the user devices and the online payment process are further described below with respect to FIGS. 2A-6.

Figure 2A:
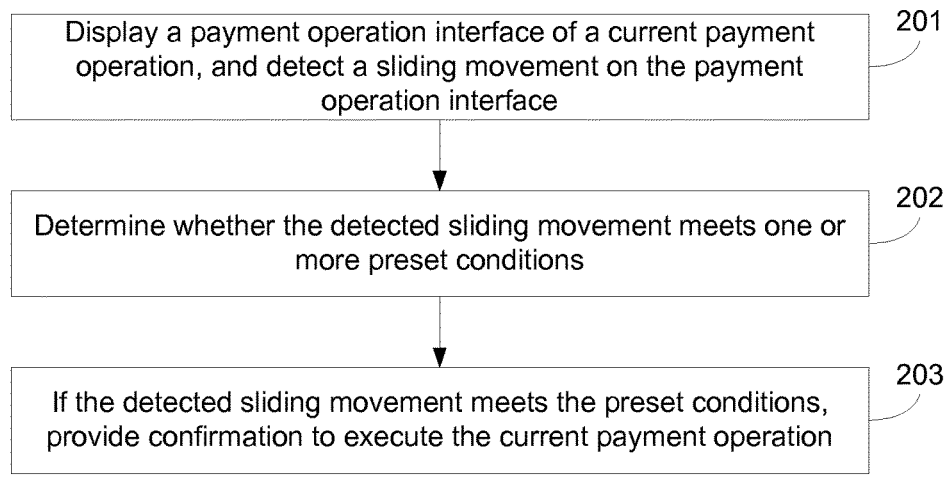
FIGS. 2A-2B are flowchart diagrams of a method of performing confirmation of operation execution in accordance with some embodiments.
Figure 2B:
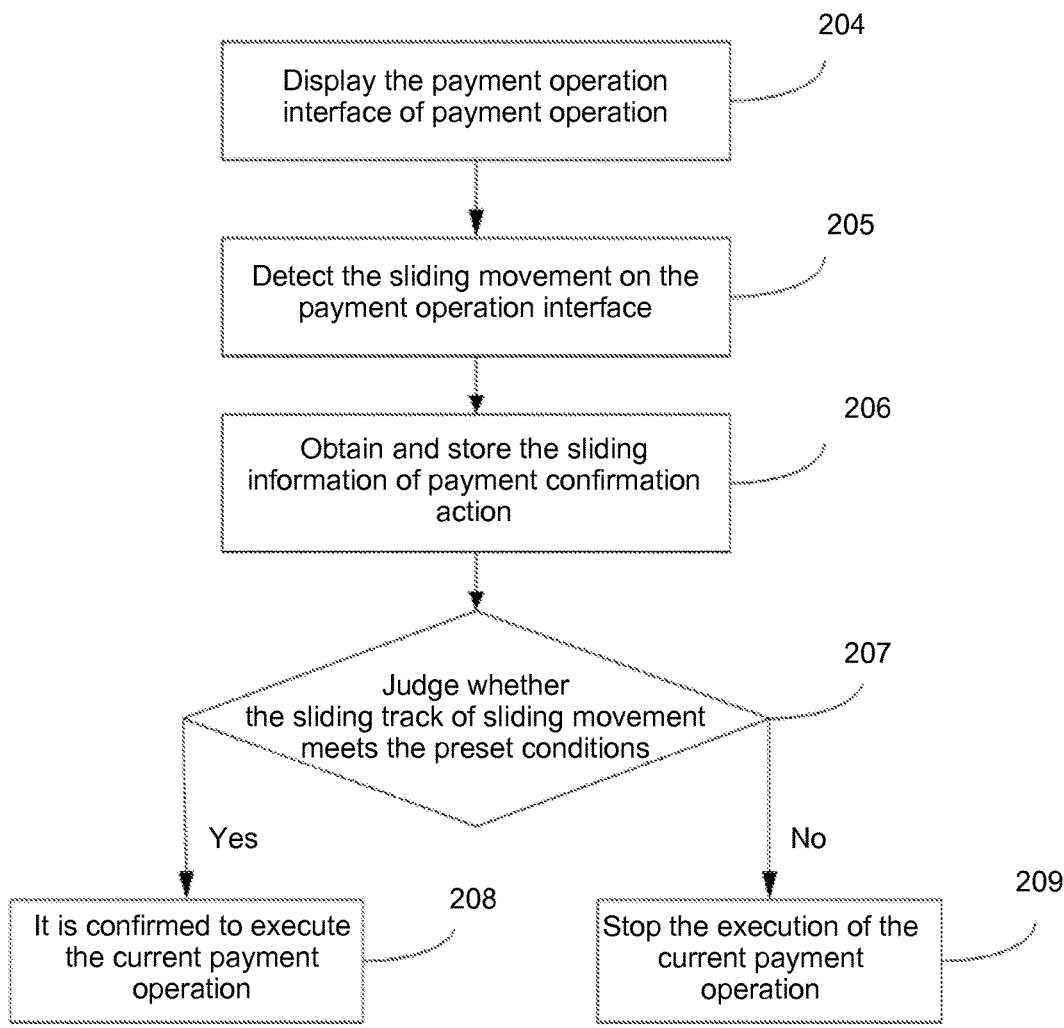

FIGS. 2A-2B are flowchart diagrams of a method of performing confirmation of operation execution in accordance with some embodiments. In some embodiments, the method is performed by a user device (e.g., user device 122 or 124 in FIG. 1). In some embodiments, the operation being performed is a payment operation. In some embodiments, analogous methods for confirming execution of other types of operations are possible.

In some embodiments, the device displays (201) a payment operation interface of a current payment operation, and detects a sliding movement on the payment operation interface. For example, the sliding movement can be touch-based gesture detected on a touch-screen of the device. In another example, the sliding movement can be a movement of a mouse cursor on a display, driven by a touch-based gesture on a touchpad of the device or a pointing device (e.g., a mouse) coupled to the device. In some embodiments, the data representing the detected sliding movement includes data representing at least a starting point, and an end point that is different from the starting point. In some embodiments, the data representing the detected sliding movement also includes data representing a path between the starting and the ending points of the sliding movement.

In some embodiments, the device determines (202) whether the detected sliding movement meets one or more preset conditions. In some embodiments, the device determines whether the sliding track of the sliding movement meets preset conditions.

In some embodiments, if the device determines that the detected sliding movement meets the preset conditions, the device provides (203) confirmation to execute the current payment operation.

In some embodiments, the user interface displays visual guidance on how to provide a sliding movement that meets the preset conditions. For example, the user interface optionally provides a user interface element (e.g., a confirmation button) and a visual "track" along which the user interface element can be "grabbed" and "dragged" to an end point. In some embodiments, textual instructions can be provided in the user interface to guide the user to provide the necessary sliding movement input to confirm the user's intention to execute the current payment operation.

In some embodiments, prior to the determination of whether the sliding movement (e.g., the motion path of the sliding movement) meets the preset conditions (e.g., a predetermined motion path), the device obtains and stores preset sliding movement information of payment confirmation action (e.g., a predetermined motion path). When determining whether the sliding movement meets the preset conditions, the device determines whether the detected sliding movement (e.g., the motion path of the detected sliding movement) matches with the present sliding movement information of payment confirmation action (e.g., the predetermined motion path). If the sliding movement matches with the preset sliding movement information of payment confirmation action, the device determines that the detected sliding movement meets the preset conditions.

In some embodiments, to obtain the sliding information of payment confirmation action, the device determines the starting position area and ending position area of a valid payment confirmation action, and sets the starting position area and ending position area as the preset sliding movement information of payment confirmation action.

In some embodiments, when determining whether the detected sliding movement matches with the sliding movement information of the payment confirmation action, the device determines whether the starting position of the detected sliding movement is located in the starting position area of payment confirmation action, and whether the ending position of the detected sliding movement is located in the ending position area of payment confirmation action. If the starting position of the detected sliding movement is located in the starting position area of the payment confirmation action, and in addition, the ending position of the detected sliding movement is located in the ending position area of the payment confirmation action, the device determines that the detected sliding movement matches with the preset sliding movement information of the payment confirmation action.

In some embodiments, after determining whether the starting position of the detected sliding movement is located in the starting position area of the payment confirmation action, and whether the ending position of the detected sliding movement is located in the ending position area of the payment confirmation action, if the device determines that the starting position of the detected sliding movement is not located in the starting position area of the payment confirmation action, or that the ending position of the detected sliding movement is not located in the ending position area of the payment confirmation action, the device determines that the detected sliding movement does not match with the preset sliding movement information of the payment confirmation action.

In some embodiments, after determining whether the detected sliding movement matches with the preset sliding movement information of the payment confirmation action, if the detected sliding movement does not match with the preset sliding movement information of the payment confirmation action, the device determines that the detected sliding movement does not meet the preset conditions, and the detected sliding movement is interpreted by the device to indicate a user intention to stop the execution of the current payment operation.

With the development of network technology, online shopping has stepped into people's life. Some online shopping portals provide one-click payment options, where the user enters payment information in a graphical user interface (e.g., a webpage) and submits the payment information by making a single click on a payment execution button (e.g., a "submit" button) in the same graphical user interface (e.g., the same webpage). Although this type of one-click payment transaction is quick and convenient, it does not allow for user mistakes. For example, during online shopping, a user may find that due to the lack of sufficient consideration, he or she immediately regrets the decision to execute the payment operation after having clicked on the payment execution button in a one-click payment interface. In such cases, the user is not given an opportunity to easily cancel the execution of the payment transaction after having clicked on the payment execution button. With the use of a device having a touch-sensitive display screen, a user may accidentally touch the payment execution button (e.g., the submit button) in a one-click payment interface, and cause unintended execution of the payment operation. In order to avoid economic loss of the user caused by insufficient consideration or operation mistakes, some payment interfaces provide a two-step payment and confirmation process, where after the user has entered payment information and submitted the payment information in one user interface, another user interface (e.g., a pop-up window or another webpage) is provided to the user to request a confirmation input from the user. The payment operation is only executed if the user provides the necessary confirmation input (e.g., clicking on a "confirm" button) in the separate confirmation interface. Such two-step submission and confirmation methods disrupt the continuity of the user's shopping experience and may cause the user to unnecessarily hesitate during the review process. In addition, the format and appearance of the payment information may be different in the two interfaces, making the user spend more time reviewing the entered information. In addition, the confirm button on the confirmation page is merely another button that can be accidentally clicked or touched. Thus, the user has no way of turning back once he or she has touched or clicked on the confirmation button.

As described herein, a one-step payment approval and confirmation method addresses the drawbacks of the conventional one-step execution method and the two-step submission and confirmation method. The one-step payment approval and confirmation method requires the user to provide a sliding input that meets predetermined criteria. The user cannot accidentally provide the necessary input to execute the payment operation by simply clicking or touching a button on the user interface. In addition, the user may take as much or as little time to consider the decision to execute the payment operation while providing the necessary sliding input. Furthermore, only a single interface is used to both collect the payment information and the confirmation for the execution of the payment operation. Thus, the user doesn't have to review two different sets of user interfaces that contain the payment information. This would improve the user experience of those who are certain of their intentions to make the payment, and allow sufficient time for those who need as much time to consider the decision as possible.

Refer to FIG. 2B, in some embodiments, a one-step payment approval and confirmation method includes:

204: Displaying the payment operation interface of the current payment operation.

For this step, the payment operation interface can be the page containing such contents as payment information and payment option which is displayed on a terminal screen when the payment operation is executed. Since the payment operation is executed on the payment operation interface, it is required to display the payment operation interface of the current payment operation in order to ensure execution of the current payment operation.

205: Detecting the sliding movement on the payment operation interface.

206: Obtaining and storing the sliding movement information of payment confirmation action.

For this step, since the sliding movement information of payment confirmation action is a important basis to determine whether to execute the current payment operation through judgment, and whether to execute the current payment operation is determined through subsequent judgment on this basis, it is therefore required to obtain the sliding movement information of payment confirmation action prior to the judgment whether to execute the current payment operation. In some embodiments, the sliding movement information of the payment confirmation action includes, but is not limited to, the starting position area information and the ending position area information of the payment confirmation action on the payment operation interface.

The modes through which the sliding movement information of the payment confirmation action is obtained includes, but is not limited to the following: Determining the starting position area and the ending position area of the payment confirmation action, and setting the starting position area and the ending position area as the sliding movement information of the payment confirmation action.

Specifically, since the sliding movement information of the payment confirmation action includes the starting position area and the ending position area of payment confirmation action, in order to determine the sliding movement information of the payment confirmation action, it is hence required to determine the starting position area and the ending position area of the payment confirmation action in advance. With regard to the mode by which the starting position area and the ending position area of the payment confirmation action is determined, it is allowed to determine the bottom left corner of the payment operation interface as the starting position area of the payment confirmation action, and the bottom right corner of payment operation interface as the ending position area of the payment confirmation action. Alternatively, it is applicable to determine the top right corner of payment operation interface as the starting position area of the payment confirmation action and the bottom left corner of the payment operation interface as the ending position area of the payment confirmation action. This embodiment makes no limitation on the mode by which starting position area and the ending position area of the payment confirmation action is determined. In some embodiments, users are allowed to set the sliding movement information according to their usage habits. In some embodiments, the starting and ending position areas are visually indicated in the payment operation interface, e.g., as a button within an elongated slot, where the user can grab and drag the button from the beginning of the slot (the starting position area) to the end of the slot (the ending position area). After determining the starting position area and the ending position area of the payment confirmation action, the starting position area and the ending position area are set as the sliding movement information of the payment confirmation action. This embodiment makes no limitation on the mode by which starting position area and the ending position area are set as the sliding movement information of the payment confirmation action, including but not limited to provide a setting interface, the starting position area and the ending position area are set by users based on their usage habits through this setting interface. The device obtains the starting position area and the ending position area set by user through detecting the setting operation on the setting interface by the user, and sets the starting position area and the ending position area as the sliding movement information of the payment confirmation action based on this.

As the sliding movement information of the payment confirmation action obtained in this step is an important basis for whether to execute the current payment operation through subsequent judgment, the method provided by this embodiment also therefore includes the step to store the obtained sliding movement information of the payment confirmation action after obtaining them. This embodiment makes no limitation on storing the sliding movement information of the payment confirmation action, including but not limited to store the sliding movement information of the payment confirmation action to its corresponding memory medium.

207: Judging whether the sliding track of the sliding movement meets the preset conditions, if so, executing step 208, if not, executing step 209.

For this step, in order to avoid the economic loss of user caused by insufficient consideration or wrong operation, it is required to judge whether the sliding track of sliding movement meets the preset conditions when payment operation is executed by this method provided by this implementation, and then based on judgment result, it is judged whether to execute the current payment operation through subsequent steps.

Among which, the preset conditions may be the sliding movement information of the payment confirmation action, and/or other information. In order to facilitate subsequent judgment, this embodiment takes the sliding movement information of the payment confirmation action as the preset condition. Therefore, when judging whether the sliding track of sliding movement meets the preset conditions, it judges whether the sliding track of the sliding movement matches with the sliding movement information of the payment confirmation action. For specific judgment, if the sliding track of the sliding movement matches with the sliding movement information of the payment confirmation action, it is then judged that the sliding track of the sliding movement meets the preset conditions; otherwise, if the sliding track of the sliding movement does not match with the sliding movement information of the payment confirmation action, it is then judged that the sliding track of the sliding movement does not meet the preset conditions.

Furthermore, it judges whether the sliding track of sliding movement matches with the sliding movement information of the payment confirmation action, including but not limited to:

Judging whether the starting position of the sliding track of the sliding movement is located in the starting position area of the payment confirmation action, and judging whether the ending position of the sliding track of the sliding movement is located in the ending position area of the payment confirmation action.

In some embodiments, the specific judgment includes but is not limited to the following two cases:

Case I: if the starting position of the sliding track of the sliding movement is located in the starting position area of the payment confirmation action, in addition, the ending position of the sliding track of sliding movement is located in the ending position area of the payment confirmation action, it is then judged that the sliding track of sliding movement matches with the sliding movement information of the payment confirmation action.

Figure 2C:
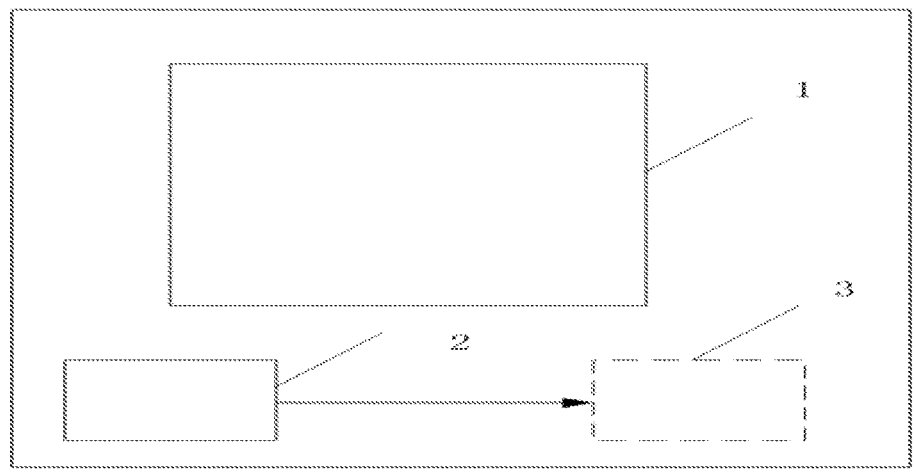
FIGS. 2C-2E are schematic diagrams illustrating exemplary payment operation interfaces in accordance with some embodiments.

FIG. 2C shows an exemplary payment operation interface, wherein, 1 refers to the position area of payment information displayed on the payment operation interface; 2 refers to the detected starting position of the sliding track of the sliding movement; 3 refers to the detected ending position of the sliding track of the sliding movement. The starting position area of the payment confirmation action is set to be in the bottom left corner of payment operation interface, the ending position area of the payment confirmation action is set to be in the bottom right corner of the payment operation interface. As shown in FIG. 2C, when the payment operation is executed, the starting position of the sliding track of the sliding movement is located in the starting position area of payment confirmation action, and the ending position of the sliding track of the sliding movement is located in the ending position area of the payment confirmation action. When the starting position of the sliding track of the sliding movement is located in the starting position area of the payment confirmation action, and the ending position of the sliding track of the sliding movement is located in the ending position area of the payment confirmation action, the device determines that the sliding track of the sliding movement matches with the stored sliding movement information of the payment confirmation action.

Case II: If the starting position of the sliding track of sliding movement is not located in the starting position area of the payment confirmation action, or the ending position of the sliding track of sliding movement is not located in the ending position area of the payment confirmation action, the device determines that the sliding track of the sliding movement does not match with the stored sliding movement information of the payment confirmation action.

In some embodiments, if the starting position of the sliding track of the sliding movement is not located in the starting position area of the payment confirmation action, the device determines that the sliding track of the sliding movement does not match with the stored sliding movement information of the payment confirmation action.

Figure 2D:
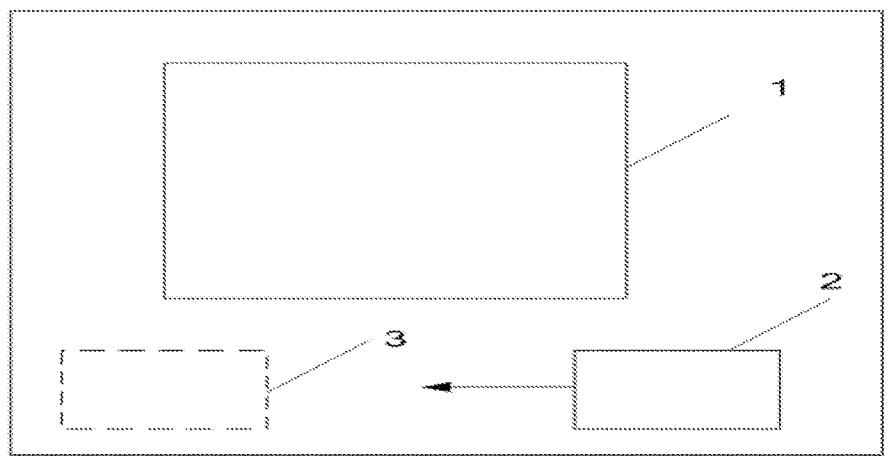

FIG. 2D illustrates an exemplary payment operation interface, wherein, 1 refers to the position area of the payment information displayed on the payment operation interface; 2 refers to the detected starting position of the sliding track of the sliding movement; 3 refers to the detected ending position of the sliding track of the sliding movement. The starting position area of the payment confirmation action is set to be in the bottom left corner of the payment operation interface, and the ending position area of the payment confirmation action is set to be in the bottom right corner of the payment operation interface. As shown in FIG. 2D, when the starting position of the sliding track of the sliding movement is not located in the starting position area of the payment confirmation action, the device determines that the sliding track of sliding movement does not match with the stored sliding movement information of the payment confirmation action.

In some embodiments, if the ending position of the sliding track of the sliding movement is not located in the ending position area of the payment confirmation action, the device determines that the sliding track of the sliding movement does not match with the stored sliding movement information of the payment confirmation action.

Figure 2E:
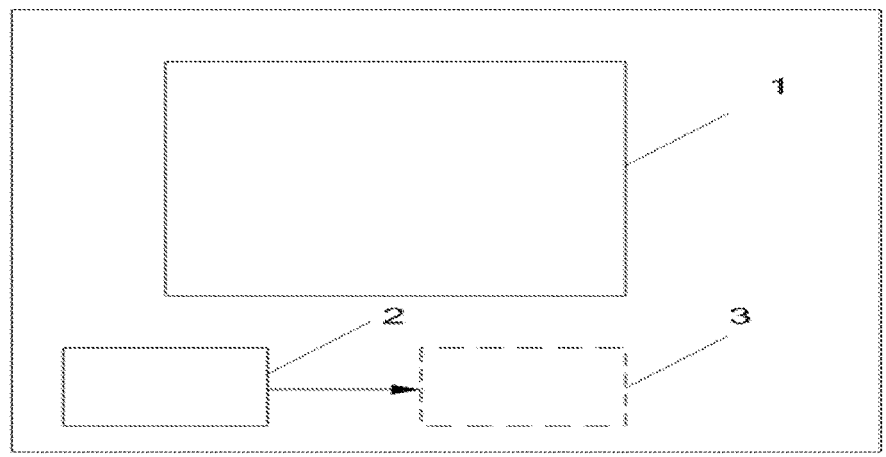

FIG. 2E illustrates an exemplary payment operation interface, wherein, 1 refers to the position area of the payment information displayed on the payment operation interface; 2 refers to the detected starting position of the sliding track of the sliding movement; 3 refers to the detected ending position of the sliding track of the sliding movement. The starting position area of the payment confirmation action is set to be in the bottom left corner of the payment operation interface, and the ending position area of the payment confirmation action is set to be in the bottom right corner of the payment operation interface. As shown in FIG. 2E, the starting position of the sliding track of sliding movement is located in the starting position area of payment confirmation action, while the ending position of the sliding track of sliding movement is not located in the ending position area of the payment confirmation action, the device determines that the sliding track of sliding movement does not match with the stored sliding movement information of the payment confirmation action.

208: The device considers that the user has confirmed his/her intention to execute the current payment operation, and executes the current payment operation.

For this step, since it has been determined that the sliding track of the sliding movement meets the preset conditions through the mentioned step 207, which indicates that the user intends to conduct this network transaction (i.e., the current payment operation), this step will then confirm to execute the current payment operation.

306: The device stops the execution of the current payment operation.

For this step, since it has been determined that the sliding track of the sliding movement does not meet the preset conditions through the mentioned step 207, which indicates that the user does not intend to conduct this network transaction (i.e., the current payment operation), this step will then stop the execution of the current payment operation.

Figure 3:
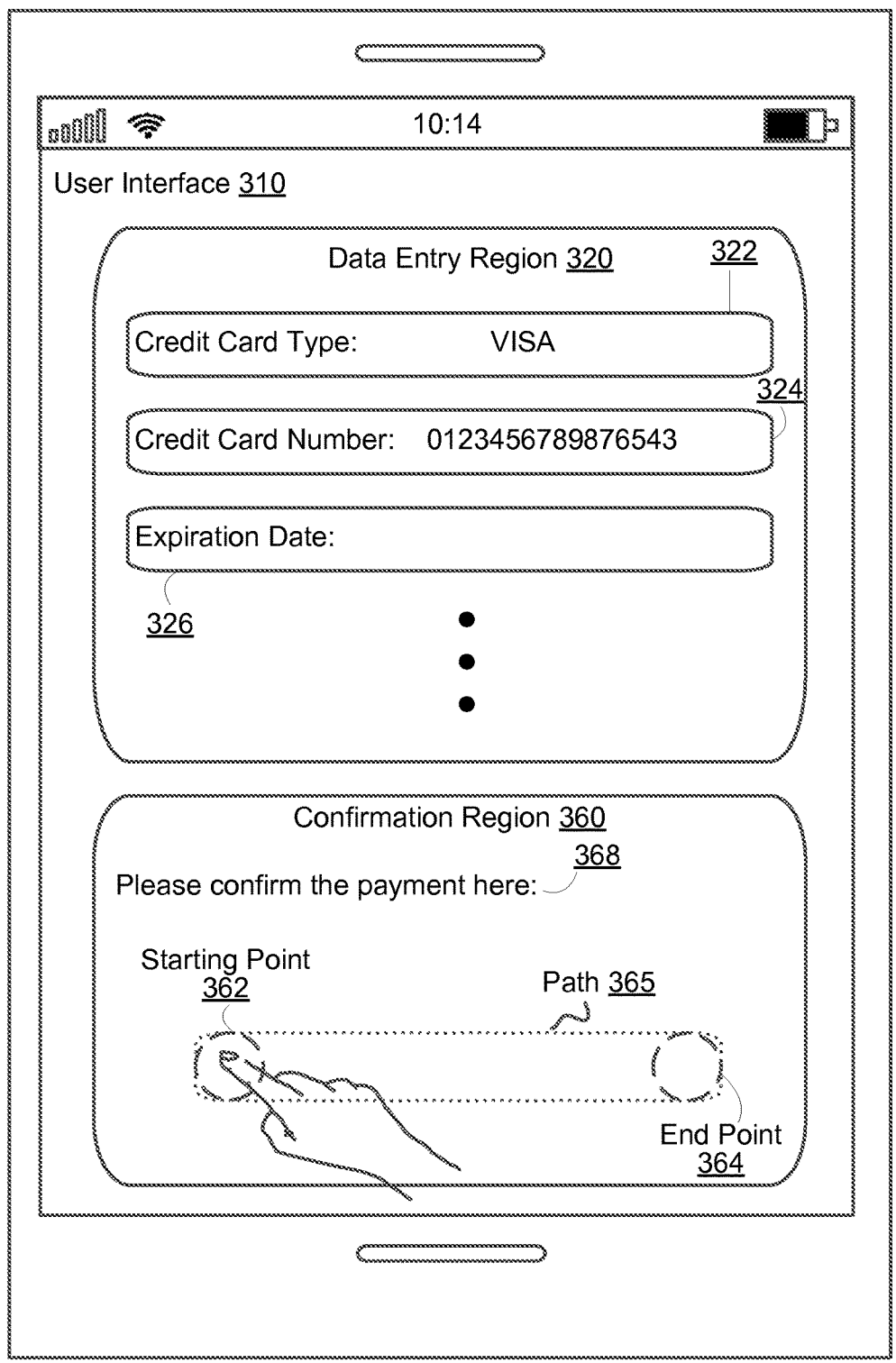
FIG. 3 is a schematic diagram illustrating a user interface of a user device in accordance with some embodiments.

FIG. 3 is a schematic diagram illustrating a user interface 310 of a user device 300 in accordance with some embodiments. The user device 300 can be structurally and functionally similar to the user devices 122, 124 shown and described with respect to FIG. 1, and the exemplary user devices 1700 and 700 shown and described with respect to FIGS. 6-7. The user interface 310 can be generated and presented by a display module of the user device 300 (e.g., similar to the display module 742 of the user device 700 in FIG. 7) on a display of the user device 300 (similar to the display 720 of the user device 700 in FIG. 7). Particularly, the user interface 310 can be presented to a user operating the user device 300 (e.g., the user A operating the user device 122, or the user B operating the user device 124 in FIG. 1) to assist the user to complete an online payment operation.

As shown in FIG. 3, the user interface 310 concurrently includes a data entry region 320 and a confirmation region 360. Although shown as the data entry region 320 being on top of the confirmation region 360, in other embodiments, the data entry region 320 and the confirmation region 360 can be placed within the user interface 310 in any other suitable arrangement. For example, the data entry region 310 can be in a left portion of the user interface 310 and the confirmation region 360 can be in a right portion of the user interface 360.

The data entry region 320 can be configured to accept one or more user entries of payment data associated with the payment operation. In some embodiments, the data entry region 320 can include one or more data entry blocks, each of which includes a message promoting the user to enter specific payment data according to that message. Each data entry block can be implemented as, for example, a text input box for entering data, a drop-down menu for selecting an item, a checkbox for making an election, or any other suitable user interface objects.

For example, as shown in FIG. 3, the data entry region 320 includes three data entry blocks: (1) a data entry block 322 implemented as a drop down menu, which includes a message "Credit Card Type" to prompt the user to select a credit card type from a list of multiple selections (e.g., VISA, MASTER, DISCOVER); (2) a data entry block 324 implemented as a text input box, which includes a message "Credit Card Number" to prompt the user to enter a 16-digit credit card number (e.g., 0123456789876543 as shown in FIG. 3); and (3) a data entry block 326 implemented as text input box or a combination of drop down menus, which includes a message "Expiration Date" to prompt the user to enter an expiration date for the credit card (not shown in FIG. 3). In some embodiments, although not shown in FIG. 3, the data entry region 320 can include other data entry blocks for accepting other payment data such as billing information, name of credit card holder, etc.

Furthermore, as shown in FIG. 3, the data entry region 320 enables the user to enter payment data within the data entry region 320 without being deviated away from the user interface 310. In other words, the user stays within the user interface 310 while entering the required payment data in the data entry region 320, without any extra or new user interface being generated.

The confirmation region 360 can be configured to receive a user input associated with confirming the payment data entered in the data entry region 320. Specifically, after the user enters payment data in the data entry region 320 and reviews the entered payment data, the user can enter a user input (e.g., a sliding movement or gesture input) in the confirmation region 360 to indicate a confirmation of the entered payment data. The entered user input can then be compared with a predefined motion path to determine if the entered user input satisfies a predetermined criterion associated with executing the payment operation. If the entered user input is determined to satisfy the predetermined criterion, the entered payment data is confirmed by the user input and the payment operation is thus executed. That is, the entered payment data is submitted to a server device (e.g., the server device 155 shown and described with respect to FIG. 1) in communication with the user device 300. Otherwise, if the entered user input is determined not to satisfy the predetermined criterion, the entered payment data is not confirmed by the user input and the payment operation is thus not executed. That is, the entered payment data is not submitted to the server device. Additionally, in some embodiments, an error message is presented to the user if the entered user input fails to satisfy the predetermined criterion.

In some embodiments, a message can be displayed in the confirmation region 360 to prompt the user to enter a user input for confirming the payment data. For example, as shown in FIG. 3, a message 368 ("Please confirm the payment here") is displayed in the confirmation region 360 to prompt a user input for confirming the payment data entered in the data entry region 320. In some other embodiments, no message or hint is displayed to prompt the user. In such embodiments, the user may know where to enter the user input for confirming the payment data. Alternatively, anywhere in the user interface 310 (except for, e.g., the data entry blocks in the data entry region 320) can function as the confirmation region to accept a user input for confirming the payment data. In some embodiments, the confirmation region can overlap with the data entry region 320. For example, after the user enters the payment data in the data entry region, the user is allowed to provide the required confirmation input (e.g., a sliding movement or gesture input) in any region on the user interface 310 (including over the data entry region) to confirm the intention to execute the payment operation using the entered payment data.

In some embodiments, a user input for confirming the payment data can be one or more sliding inputs entered by the user within the confirmation region 360. Such a sliding input can include a starting point, a path and an end point. For example, as shown in FIG. 3, a user input can be a sliding input that begins at the starting point 362, follows the path 365, and ends at the end point 364. Although shown as a continuous, straight line in FIG. 3, in other embodiments, a user input for confirming the payment data can consist of one or more discontinuous sliding inputs, each of which has a different starting point, path and/or end point as that shown in FIG. 3. For example, a user input for confirming the payment data can be a continuous sliding input with a path forming a checkmark (i.e., ✓). For another example, a user input for confirming the payment data can consist of two separate, discontinuous sliding inputs that form a cross (i.e., x). Other required motion path can be preset by the user or the device. In some embodiments, the required motion path is visually displayed on the user interface 310 (e.g., within the confirmation region 360) to guide the user's confirmation input.

The user input for confirming the payment data can be entered by the user in the confirmation region 360 using any suitable input means. For example, as shown in FIG. 3, the user can use her finger or a stylus to enter a touch-based input (e.g., the sliding input that begins from the starting point 362, follows the path 365, and ends at the end point 364) in the confirmation region 360. For another example, the user can use a mouse, a keyboard, a touch pen, or any other suitable input means to enter a user input (e.g., a grab and drag input on a sliding button).

Figure 7:
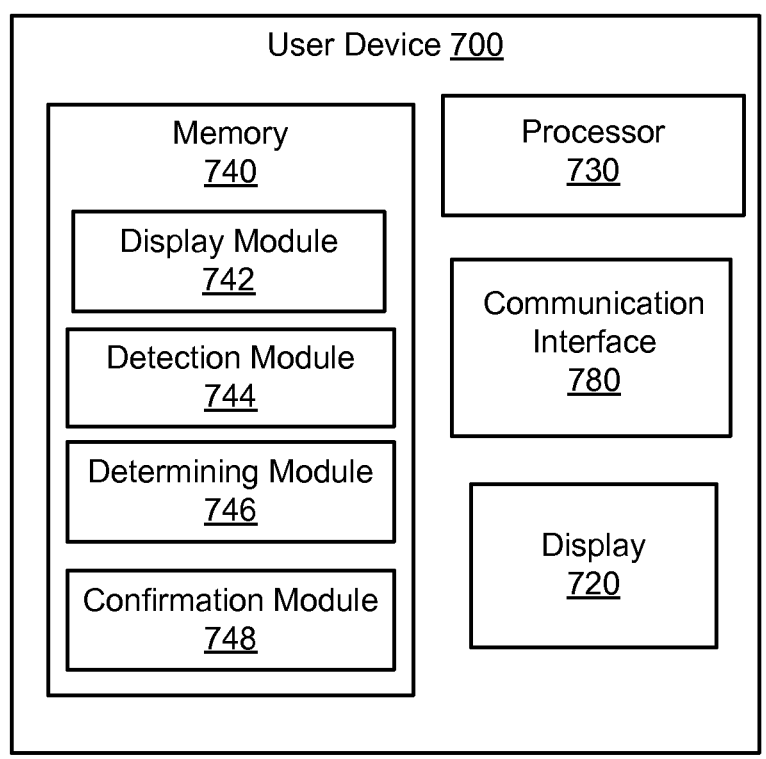
FIG. 7 is a block diagram of a user device in accordance with some embodiments.

In some embodiments, as the user entering the user input in the confirmation region 360, a detection module of the user device 300 (e.g., similar to the detection module 744 of the user device 700 in FIG. 7) can detect the user input. Particularly, the detection module can detect the user input in the confirmation region 360 while the entered payment data being still displayed in the data entry region 320. In other words, the user operates on the same user interface 310 when the user enters the payment data in the data entry region 320, when the user enters the user input in the confirmation region 360, and when the user input is detected and processed by the user device 300. In some embodiments, the detection module can be configured to determine location(s) and/or trajectory associated with the user input based on the detected user input. For example, the detection module can generate, based on the detected user input in the confirmation region 360, data (e.g., a set of coordinates) representing a location of the starting point 362, data (e.g., multiple sets of coordinates) representing a trajectory of the path 365, and/or data (e.g., a set of coordinates) representing a location of the end point 364.

In some embodiments, the detection module can be configured to determine other information and/or data associated with the user input. Such information and/or data can provide additional information associated with the payment operation. For example, the detection module can determine a speed of the sliding input entered by the user. Such speed information can be used to indicate a level of hesitation of the user in making the payment. That is, a lower speed indicates a higher level of hesitation of the user in making the payment. In some embodiments, based on the detected level of hesitation, the device optionally presents some assistance to the user (e.g., a coupon, a visual or audio prompt) to help the user make up his/her mind about the current payment operation. For another example, the detection module can determine a measurement of pressure applied by the user's finger on the touch screen of the user device 300. Such a measurement of pressure can be used to detect a possible fraud activity. That is, a measurement of pressure outside a predetermined range of pressure associated with a default user of the user device 300 indicates a high possibility that the person entering the user input is not the default user associated with the user device 300. In some embodiments, based on the detected pressure, the device optionally requires a higher level of match accuracy for matching the entered sliding movement input to the required motion path.

As described above, in some embodiments, the sliding movement is the only input required to confirm the user's intention to execute the current payment operation using the entered payment data. In some embodiments, although not shown in FIG. 3, the confirmation region 360 can include one or more other objects that assist the user to complete the confirmation step. For example, the confirmation region 360 can include a "Submit" button, a "Retry" button, and/or a "Cancel" button. If the user enters a user input (e.g., a sliding input) in the confirmation region 360 and then clicks the "Submit" button, the user input is sent to the back end of the user device 300 for further processing. Subsequently, the user input is processed at the back end of the user device 300 (e.g., a determining module of the user device 300) to determine if the user input qualifies as the required sliding input. Alternatively, if the user enters the user input in the confirmation region 360 and then clicks the "Retry" button, the user input is cleared from the confirmation region 360 without being sent to the back end of the user device 300 for further processing. Thus, the user can attempt to enter a new user input in the confirmation region 360. As another alternative, if the user clicks the "Cancel" button (regardless of the user having entered a user input in the confirmation region 360 or not), the transaction is canceled. In some embodiments, when the transaction is canceled, the payment data entered in the data entry region 320 can be cleared, or the user interface 310 can be replaced by a previous user interface (i.e., the payment process returns to a previous step).

In some embodiments, after the user input is detected by the detection module of the user device 300, a determining module of the user device 300 (e.g., similar to the determining module 746 of the user device 700 in FIG. 7) can compare the detected user input with a predefined motion path to determine if the detected user input satisfies a predetermined criterion. Specifically, the determining module can be configured to compare data associated with the detected user input with data of the predefined motion path, and then make a determination based on the result of the comparison. The predetermined criterion can be associated with the predefined motion path, and can be defined in any suitable method or format. For example, the predetermined criterion can be defined such that the predetermined criterion is satisfied if and only if the difference between the data of the detected user input and the data of the predefined motion path is within a predetermined range (e.g., less than a predetermined threshold). For another example, the predetermined criterion can be defined such that the predetermined criterion is satisfied if and only if the data of the detected user input falls within a tolerance range associated with the predefined motion path.

Figure 4A:
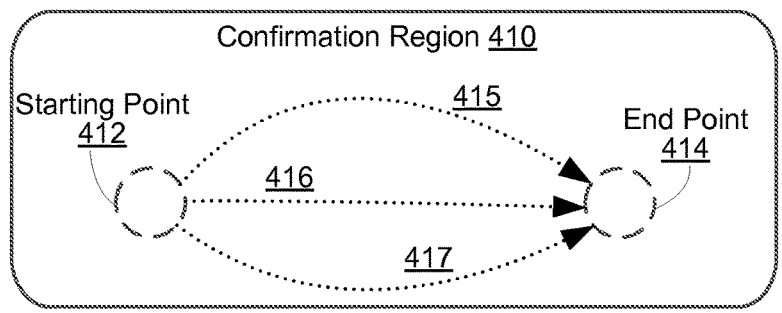
FIGS. 4A-4D are schematic diagrams illustrating a portion of user interfaces of user devices in accordance with some embodiments.
Figure 4B:
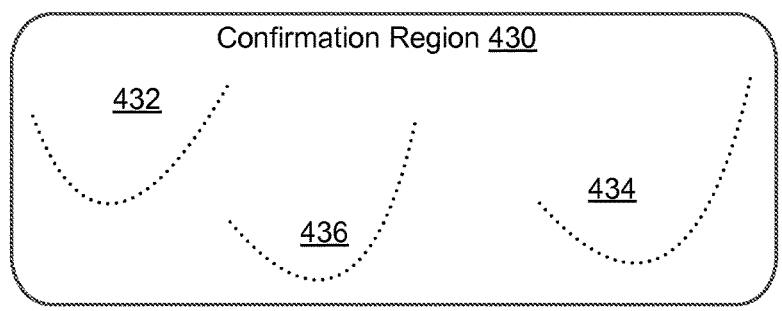
Figure 4C:
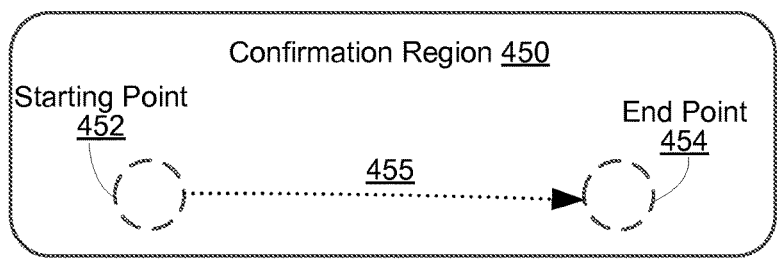

FIGS. 4A-4D are schematic diagrams, each of which illustrates a portion of a user interface of a user device in accordance with some embodiments. Confirmation regions 410, 430, 450 and 470 shown in FIGS. 4A-4D are functionally similar to the confirmation region 360 of the user interface 310 shown and described with respect to FIG. 3. The user interfaces associated with the confirmation regions 410, 430, 450 and 470 are similar to the user interface 310 shown and described with respect to FIG. 3. FIGS. 4A-4C illustrate various predetermined criteria for comparing a detected user input with a predefined motion path. In some embodiments, although not shown in FIGS. 4A-4C, any other suitable criterion can be used for comparing a detected user input with a predefined motion path.

In some embodiments, the predetermined criterion can be defined such that a portion of the detected user input is compared with a corresponding portion of the predefined motion path. In some instances, the predetermined criterion can be defined such that the predetermined criterion is satisfied if and only if a starting point of the detected user input matches a predefined starting location of the predefined motion path, and an end point of the detected user input matches a predefined end location of the predefined motion path. For example, as shown in FIG. 4A, a predetermined criterion is defined such that the predetermined criterion is satisfied if and only if a starting point 412 matches a predefined starting location of a predefined motion path and an end point 414 matches a predefined end location of the predefined motion path. In other words, a detected user input can satisfy the predetermined criterion based on the starting point and the end point of the detected user input, regardless of the path of the detected user input that connects the starting point and the end point. As a result, the detected user inputs 415, 416 and 417 can all satisfy the predetermined criterion (assuming that the starting point 412 and the end point 414 match, respectively, the predefined starting point and the predefined end point of the predefined motion path) regardless of the different motion paths of the detected user inputs 415, 416 and 417.

In some embodiments, the predetermined criterion can be defined such that the predetermined criterion is satisfied if and only if a path of the detected user input matches a predefined path of the predefined motion path. For example, as shown in FIG. 4B, a predetermined criterion is defined such that the predetermined criterion is satisfied if and only if a path of the detected user input matches a predefined arc-shaped path. In other words, a detected user input can satisfy the predetermined criterion based on the path of the detected user input, regardless of the starting point and the end point of the detected user input. As a result, the detected user inputs 432, 434 and 436 can all satisfy the predetermined criterion (assuming that the paths of the detected user inputs 432, 434 and 436 all match the predefined arc-shaped path) regardless of the different starting points and end points of the detected user inputs 432, 434 and 436. Note that, in some embodiments, the user inputs 432, 434, and 436 need not be exactly the same as the predefined motion path, and only need to match the predefined motion path (e.g., the predefined arc-shaped path) to a predetermined level of matching accuracy.

In some embodiments, different from the embodiments shown in FIGS. 4A and 4B, the predetermined criterion can be defined such that the detected user input as a whole is compared with the predefined motion path as a whole. That is, each portion (e.g., starting point, path, end point) of the detected user input is compared with each corresponding portion of the predefined motion path, and the predefined criterion is satisfied if and only if each portion of the detected user input matches each corresponding portion of the predefined motion path. For example, as shown in FIG. 4C, a predetermined criterion is defined such that the predetermined criterion is satisfied if and only if a starting point 452 matches a predefined starting location of a predefined motion path, a path 455 matches a predefined path of the predefined motion path, and an end point 454 matches a predefined end location of the predefined motion path. As a result, a detected user input does not satisfy the predetermined criterion if any of the starting point, the path, or the end point of the detected user input fails to match the corresponding portion of the predefined motion path.

Returning to FIG. 3, in some embodiments, the predefined motion path can be predefined by the user device 300 (e.g., defined by software stored in and executed at the user device 300). In such embodiments, information of the predefined motion path can be provided or presented to the user operating the user device 300 prior to the user performing the payment operation. For example, as shown in FIG. 3, the predefined motion path can be predefined by the user device 300 as a sliding input that begins from the starting point 362, follows the path 365 and ends at the end point 364. Information or instructions associated with such a predefined motion path can be provided to the user prior to the user performing the payment operation in, for example, a user manual of the online payment system.

In some embodiments, information or instructions associated with entering a user input that follows the predefined motion path can be presented to the user during the user performing the payment operation. For example, as shown in FIG. 3, the predefined motion path can be predefined by the user device 300 as a sliding input that begins from the starting point 362, follows the path 365 and ends at the end point 364. After the user enters payment data in the data entry region 320, the starting point 362, the path 365 and/or the end point 364 can be illuminated in the confirmation region 360 to prompt the user to enter a user input according to the illuminated motion path (i.e., the predefined motion path). Additionally, in some instances, an arrow pointing from the starting point 362 towards the end point 364 (not shown in FIG. 3) can be displayed on or near the path 365 to indicate a direction of the predefined sliding input to the user.

Figure 4D:
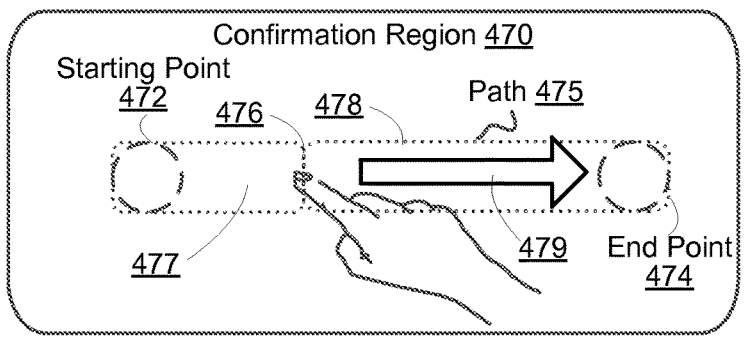

Moreover, in some embodiments, additional indication can be presented to the user during the user entering the user input for confirming the payment data. For example, as shown in FIG. 4D, a path 475 of a predefined motion path includes two mutually-exclusive portions 477 and 478 that are separated by a line 476. When a user enters a user input in the confirmation region 470 by generating a sliding input (starting from the starting point 472) using her finger (as shown in FIG. 4D), the detection module of the user device (e.g., the detection module 746 of the user device 700 in FIG. 7) can (substantially) simultaneously detect the currently received portion of the sliding input. The detection module can further determine whether the currently received portion of the sliding input has reached a predefined threshold state by crossing the line 476 (i.e., entering from the portion 477 into the portion 478).

Upon determining that the currently received portion of the sliding input has reached the predefined threshold state (i.e., has crossed the line 476, or in other words, has entered from the portion 477 into the portion 478), the user device can display a visual prompt (e.g., an arrow 479 as shown in FIG. 4D) to indicate the remaining portion (i.e., the portion 478 and the end point 474) of the required sliding input. Thus, the user is guided by the arrow 479 to complete the remaining portion of the sliding input. Although shown in FIG. 4D as the visual prompt (e.g., the arrow 479) being an indication of a proposed continuation path for completing the required sliding input, in other embodiments, the visual prompt can be in any other suitable form. For example, the end point 474 can be illuminated as the visual prompt to indicate a destination of the required sliding input. Additionally, in some embodiments, the user device can be configured to provide concurrent visual feedback indicating the currently received portion of the sliding input in the confirmation region 470. For example, the currently received portion 476 can be illuminated as the user's finger moves from the starting point 472 towards the end point 474.

Returning to FIG. 3, in some embodiments, the predefined motion path can be predefined by the user operating the user device 300 (e.g., the user A operating the user device 122 or the user B operating the user device 124 in FIG. 1). In such embodiments, the user can provide one or more sample sliding inputs to the user device 300 prior to using the user device 300 for performing the payment operation. The user can provide the sample sliding input(s) to the user device in various suitable methods. For example, the user can generate a sliding input on a display of the user device 300 (e.g., the display 720 of the user device 700 in FIG. 7) using a finger, a touch pen, or a mouse. For another example, the user can enter data (e.g., coordinates) representing a starting location and an end location of a sample sliding input using a keyboard. For yet another example, the user can select a sliding input from a set of predefined sliding inputs provided by the user device 300 (e.g., provided by software stored in and executed at the user device 300).

In some embodiments, the user can provide one or more sample sliding inputs in, for example, a configuration session associated with the payment operation. Such a configuration session can be used to configure various settings (e.g., the predefined motion path) of the online payment operation performed at the user device 300. Particularly, the predefined motion path can be defined based at least in part on the one or more sample sliding inputs provided by the user in the configuration session. For example, the user can be required to provide three sample sliding inputs. The predefined motion path can be defined based on an average motion path of the three sample sliding inputs. Additionally, a variance of the three sample sliding inputs can be used to set a tolerance range for the predefined motion path. As a result, the predetermined criterion can be defined such that the predetermined criterion is satisfied if and only if the deviation of a detected user input from the average motion path is within the tolerance range.

In some embodiments, upon the determining module of the user device 300 determining that the detected user input satisfies the predetermined criterion (e.g., the path of the detected user input matches the path of the predefined motion path, the starting point and/or the end point of the detected user input match the starting point and/or the end point of the predefined motion path, etc.), a confirmation module of the user device 300 (e.g., similar to the confirmation module 748 of the user device 700 in FIG. 7) can execute the payment operation. Specifically, the confirmation module can, among other functions, submit the payment data entered in the data entry region 320 to the server device in communication with the user device 300, thus to complete the payment operation.

In some embodiments, the confirmation module can execute the payment operation without diverting the user away from the user interface 310. In such embodiments, the user confirms the payment data in the data entry region 320 by entering the user input in the confirmation region 360 without being presented an additional user interface (e.g., a pop-up window, a new webpage) that contains, for example, a summary of payment information. In some embodiments, after the payment operation is executed and the payment data is submitted to the server device, a new user interface (e.g., a pop-up window, a new webpage) can be presented to the user indicating the completion of the payment process. In such embodiments, no user input or operation is required on the new user interface (not shown in FIG. 3).

In some embodiments, upon detecting that (1) the user has entered a user input in the confirmation region 360, and (2) the payment data received in the data entry region 320 is incomplete, the confirmation module (or the detection module) of the user device 300 can display a message to indicate an error of the payment data. Such an error message can be displayed to the user, for example, in a pop-up window, in a new webpage, or by any other suitable method (e.g., highlighting the data entry block that needs to be completed, showing an alert symbol besides the data entry block with the missing data). In some embodiments, such an error message can be displayed to the user regardless of the user input being a legitimate confirmation for executing the payment operation or not (e.g., the user input satisfying the predetermined criterion or not). In some embodiments, such an error message is not displayed to the user if the user has not entered any input in the confirmation region 360.

In some embodiments, upon the determining module of the user device 300 determining that the detected user input fails to satisfy the predetermined criterion (i.e., the user input does not qualify as a legitimate confirmation), the confirmation module of the user device 300 can display an error message to the user without executing the payment operation (i.e., without submitting the payment data to the server device). Such an error message can indicate an error in the user input for confirming the payment, and/or prompt the user to enter a new user input for the confirmation. In some embodiments, a user can be limited to a finite number of attempts for entering the confirmation. For example, if a user fails to enter a legitimate user input for the confirmation for three times, the transaction is canceled, the user account is locked, and/or so on.

In some embodiments, upon determining that the detected user input fails to satisfy the predetermined criterion, the confirmation module of the user device 300 can present additional information relevant to the payment operation to the user. The additional information can include, for example, decision-making assistance messages to the user. Such decision-making assistance messages can be used to prompt, guide, instruct, help or tempt the user to proceed with the payment process, to switch to another product, and/or so on. Such additional information can be presented to the user in any suitable form such as, for example, a pop-up window, a text message or an image displayed within the user interface 310, an audible message played to the user via a speaker, an online dialog box, etc. For example, an image containing a digital coupon for a product associated with the payment operation can be presented within the user interface 310. For another example, an advertisement for a product as an alternative to the product associated with the payment operation can be presented in a pop-up window. For yet another example, an audible message including key features of the product associated with the payment operation can be played to the user.

FIG. 5 is a flowchart diagram of a method 500 for performing an online payment process in accordance with some embodiments. In some embodiments, the method 500 is performed by an electronic device with one or more processors and memory. For example, in some embodiments, the method 500 is performed by a user device (e.g., the user devices 122, 124, 300, 1700, 700 in FIGS. 1, 3, 6 and 7) that is operated by a user (e.g., the users A, B in FIG. 1) and communicates with a server device (e.g., the server device 155 in FIG. 1). In some embodiments, the method 500 is governed by instructions that are stored in a non-transitory computer readable storage medium of the electronic device (e.g., the memory 120 of the user device 1700 and the memory 740 of the user device 700 in FIG. 7) and executed by one or more processors of the electronic device (e.g., the processor 180 in FIG. 6 and the processor 730 of the user device 700 in FIG. 7). In some embodiments, as described below, the method 500 can be associated with a one-step payment approval and confirmation service provided to the user of the user device.

At 502, the electronic device concurrently displays a data entry region and a confirmation region in a user interface of the electronic device. In some embodiments, the data entry region and the confirmation region can be displayed by a display module of the electronic device that is similar to the display module 742 of the user device 700 in FIG. 7. The data entry region and the confirmation region of the user interface are similar to the data entry region 320 and the confirmation region 360 of the user interface 310 in FIG. 3, respectively. Specifically, the data entry region is configured to accept user entry of payment data associated with a payment operation. The confirmation region is configured to require a sliding input that follows a predefined motion path to cause execution of the payment operation. As a result of the data entry region and the confirmation region being concurrently displayed in the same user interface, payment approval and confirmation can be provided in a convenient and efficient one-step fashion via that user interface to the user.

For example, as shown in FIG. 3, a display module of the user device 300 concurrently displays the data entry region 320 and the confirmation region 360 in the user interface 310. The data entry region 320 includes one or multiple data entry blocks (e.g., the data entry blocks 322, 324, 326) configured to prompt and receive payment data entered by the user. The confirmation region 360 includes a message 368 prompting the user to enter a user input as a confirmation of the payment data entered in the data entry region 320. If the user input entered in the confirmation region 360 is a sliding input that follows a predefined motion path (or satisfies a predetermined criterion in any other suitable means), the payment operation can be executed.

At 504, the electronic device receives, in response to the user operates the data entry region of the user interface, the payment data associated with the payment operation. The user can input the payment data in the data entry region using, for example, her finger, a touch pen, a mouse, a keyboard, or any other suitable input means. The user can input the payment data in one or more data entry blocks in the data entry region using, for example, a drop-down menu, a text input box, a checkbox, or any other suitable user interface objects. For example, as shown in FIG. 3, the user selects "VISA" as the credit card number in a drop-down menu in the data entry block 322, and enters "0123456789876543" as the credit card number in a text input box in the data entry block 324.

At 506, while the data entry region containing the received payment data being displayed in the user interface, the electronic device detects a user input in the confirmation region of the user interface. In some embodiments, the user input can be detected by a detection module of the electronic device that is similar to the detection module 744 of the user device 700 in FIG. 7. The user input can be, for example, a sliding input generated in the confirmation region. For example, as shown in FIG. 3, while the data entry region 320 containing the received payment data being displayed in the user interface 310, a detection module of the user device 300 detects a sliding input entered by the user in the confirmation region 360. The sliding input starts from the starting point 362, follows the path 365, and ends at the end point 364.

At 508, the electronic device determines, in accordance with a predetermined criterion, whether the detected user input qualifies as the sliding input that follows the predefined motion path. In some embodiments, the determination can be made at a determining module of the electronic device that is similar to the determining module 746 of the user device 700 in FIG. 7. In the example of FIG. 3, a determining module of the user device 300 determines, in accordance with a predetermined criterion, whether the detected sliding input (consisting of the starting point 362, the path 365 and the end point 364) qualifies as the sliding input that follows the predefined motion path.

In some embodiments, the predefined motion path can be a motion path predefined by the electronic device (e.g., predefined by software stored in and executed at the electronic device). In other embodiments, the predefined motion path can be set based at least in part on one or more sample sliding inputs provided by the user prior to the method 500 being performed. For example, the one or more sample sliding inputs can be provided by the user in a configuration session for configuring the one-step payment approval and confirmation service before the user interface being presented to the user. Furthermore, in some embodiments, as shown and described above with respect to FIGS. 4A-4C, the predetermined criterion can be any suitable criterion that is based on a comparison of one or more portions of the detected user input (e.g., a starting point, a path, an end point, etc.) with the corresponding portion(s) of the predefined motion path.

At 510, upon determining that the detected user input qualifies as the required sliding input, the electronic device executes the payment operation in accordance with the received payment data. In some embodiments, the payment operation can be executed at a confirmation module of the electronic device that is similar to the confirmation module 748 of the user device 700 in FIG. 7. In some embodiments, as a result of executing the payment operation, the confirmation module sends the received payment data to the server device in communication with the electronic device. In some embodiments, upon determining that the detected user input fails to qualify as the required sliding input, the electronic device can, for example, display an error message to the user, prompting the user to reenter a sliding input for confirming the payment data.

In the example of FIG. 3, upon the determining module of the user device 300 determines that the detected sliding input (consisting of the starting point 362, the path 365 and the end point 364) qualifies as the required sliding input, the confirmation module of the user device 300 executes the payment operation by sending the payment data received in the data entry region 320 to the server device in communication with the user device 300.

Figure 6:
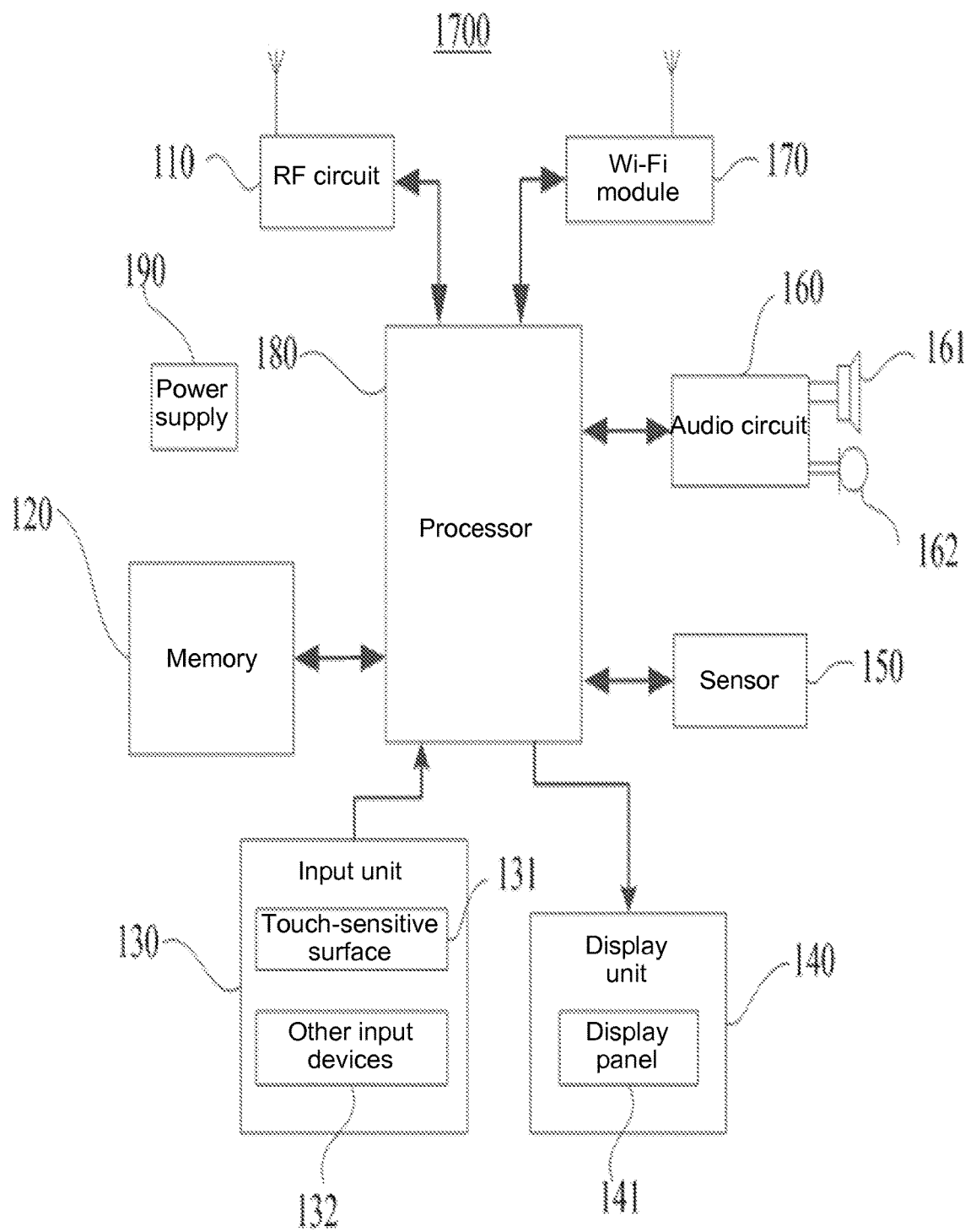
FIG. 6 is a schematic diagram illustrating the structure of a terminal device in accordance with some embodiments.

FIG. 6 is a schematic diagram illustrating the structure of a terminal device 1700 in accordance with some embodiments. The terminal device 1700 can be an electronic device that is structurally and functionally similar to the user devices 122, 124, 700 and 300 shown and described above with respect to FIGS. 1-3. For example, the terminal device 1700 can be a smart phone, a PDA, a tablet, a laptop, etc. The terminal device 1700 can be used to implement the one-step payment approval and confirmation method (e.g., the method 500 in FIG. 5) described above with respect to FIGS. 1-5.

As shown in FIG. 6, the terminal device 1700 includes a radio frequency (RF) circuit 110, a memory 120 comprising of one or more computer-readable storage media, an input unit 130, a display unit 140, a sensor 150, an audio circuit 160, a Wi-Fi (Wireless Fidelity) module 170, a processor 180 including one or more processing cores, a power supply 190, and/or other components (not shown in FIG. 6). One skilled in the art understands that the structure of the terminal device 1700 shown in FIG. 6 does not constitute a limitation for the terminal device 1700, and may include more or less components than those illustrated in FIG. 6. Furthermore, the components of the terminal device 1700 (shown or not shown in FIG. 6) can be combined and/or arranged in different ways other than that shown in FIG. 6.

The RF circuit 110 is configured to send and receive data, and in particular, to send uplink to data to and/or receive downlink data from a base station (e.g., a server device). The RF circuit 110 is configured to send the received data to the processor 180 for further processing. The RF circuit 110 can include, for example, one more antenna, amplifier, tuner, oscillator, subscriber identity module (SIM) card, transceiver, coupler, low noise amplifier (LNA), duplexer, etc. The RF circuit 110 is configured to wirelessly communicate with other network or device using any suitable wireless communication protocol such as, for example, GSM, GPRS, CDMA, WCDMA, LTE, etc.

The memory 120 is configured to store software programs and/or modules. The processor 180 can execute various applications and data processing functions included in the software programs and/or modules stored in the memory 120. The memory 120 includes, for example, a program storage area and a data storage area. The program storage area is configured to store, for example, an operating system and application programs. The data storage area is configured to store data received and/or generated during the use of the terminal device 1700 (e.g., payment data, audio data, phone book, etc.). The memory 120 can include one or more high-speed RAM, non-volatile memory such as a disk storage device and a flash memory device, and/or other volatile solid state memory devices. In some embodiments, the memory 120 also includes a memory controller configured to provide the processor 180 and the input unit 130 with access to the memory 120.

The input unit 130 is configured to receive input data and signals (e.g., payment data) and also generate signals caused by operations and manipulations of input devices such as, for example, a user's finger, a touch pen, a keyboard, a mouse, etc. Specifically, the input unit 130 includes a touch-sensitive surface 131 (also known as touch screen or touchpad) and other input devices 132. The touch-sensitive surface 131 is configured to collect touch operations on or near the touch-sensitive surface 131 that are performed by a user of the terminal device 1700, such as operations performed by the user using a finger, stylus, touch pen, or any other suitable object or attachment on or near the touch-sensitive surface. In some embodiments, the touch-sensitive surface 131 can optionally include a touch detection apparatus and a touch controller. The touch detection apparatus can detect the direction of the touch operation and signals generated by the touch operation, and then transmit the signals to the touch controller. The touch controller can receive the signals from the touch detection apparatus, convert the signals into contact coordinate data, and then send the contact coordinate data to the processor 180. The touch controller can also receive and execute commands received from the processor 180. The touch-sensitive surface 131 can be implemented using various types of technologies such as, for example, resistive touch screen, capacitive touch screen, infrared ray touch screen, surface acoustic wave (SAW) touch screen, etc. The other input devices 132 can include, for example, a physical keyboard, a function key (such as a volume control key, a switch key, etc.), a trackball, a mouse, a joystick, etc.

The display unit 140 is configured to display information entered by the user, information provided to the user, various graphical user interfaces (GUIs) of the terminal device 1700, and/or the like. The GUIs can include, for example, graph, text, icon, video, and/or any combination of them. The display unit 140 includes a display panel 141, which can be, for example, a LCD, a LED, organic light-emitting diode (OLED) display, etc. Furthermore, the touch-sensitive surface 131 can cover the display panel 141. After a touch operation on or near the touch-sensitive surface 131 is detected, the touch-sensitive surface 131 transmits information of the touch operation to the processor 180, where the type and/or other information of the touch operation is determined. The processor 180 sends visual information to the display panel 141 based on the determined type of the touch operation. The visual information is then displayed on the display panel 141. Although shown in FIG. 6 as two separate components for the input and output functions respectively, in other embodiments, the touch-sensitive surface 131 and the display panel 141 can be integrated into one component for realization of the input and output functions.

The terminal device 1700 includes at least one sensor 150 such as, for example, a light sensor, a motion sensor, and/or other types of sensors. A light sensor can be, for example, an ambient light sensor or a proximity sensor. The ambient light sensor is configured to adjust the brightness of the display panel 141 according to the light intensity received at the ambient light sensor. The proximity sensor is configured to turn off the display panel 141 and/or backlight when the terminal device 1700 moves near the user's ear. A motion sensor can be, for example, a acceleration transducer that can measure acceleration at each direction (e.g., 3-axis directions), measure the magnitude and direction of gravity when stationary, be used in applications for recognition of the posture of the terminal device 1700 (e.g., horizontal and vertical screen switching, games, magnetometer posture calibration), be used in applications related to vibration recognition (e.g., pedometer, percussion), and/or the like. Additionally, although not shown in FIG. 6, the terminal device 1700 can also include other sensory devices such as, for example, a gyroscope, a barometer, a hygrometer, a thermometer, an infrared sensor, and/or the like.

The audio circuit 160, the speaker 161 and the microphone 162 collectively provide an audio interface between the user and the terminal device 1700. The audio circuit 160 transmits an electric signal converted from audio data to the speaker 161, where the electric signal is converted and output as an acoustical signal by the speaker 161. The microphone 162 converts a collected acoustical signal into an electric signal, which is then sent to and converted to audio data by the audio circuit 160. The audio data is sent to the processor 180 for further processing, and then sent to another terminal device through the RF circuit 110 or stored in the memory 120 for further processing. The audio circuit 160 can also include an earplug jack to enable communication between a peripheral headset and the terminal device 1700.

The Wi-Fi module 170 is configured to enable Wi-Fi communication between the terminal device 170 and other devices or network. Thus, the Wi-Fi module 170 provides the user with a wireless access to broadband Internet. As a result, the user can use the Wi-Fi connection to, for example, send and receive E-mails, browse web pages, access streaming media, and so on. Although shown in FIG. 6 as including the Wi-Fi module 170, in some other embodiments, a terminal device can operate without such a Wi-Fi module or the Wi-Fi functionality.

The processor 180 functions as a control center of the terminal device 1700. The processor 180 is configured to operatively connect each component of the terminal device 1700 using various interfaces and circuits. The processor 180 is configured to execute the various functions of the terminal device 1700 and to perform data processing by operating and/or executing the software programs and/or modules stored in the memory 120 and using the data stored in the memory 120. In some embodiments, the processor 180 can include one or more processing cores. In some embodiments, an application processor and a modem processor can be integrated at the processor 180. The application processor is configured to monitor and control the operating system, user interfaces, application programs, and so on. The modem processor is configured to control wireless communication.

The power supply 190 is used to provide power for the various components of the terminal device 1700. The power supply 190 can be, for example, a battery. The power supply 190 can be operatively coupled to the processor 180 via a power management system that controls charging, discharging, power consumption, and/or other functions related to power management. In some embodiments, the power supply 190 can include one or more DC and/or AC power source, recharging system, power failure detection circuit, power converter or inverter, power supply status indicator, and/or the like.

Although not shown in FIG. 6, in some embodiments, the terminal device 1700 can include, for example, a camera, a Bluetooth module, and/or other suitable components. The terminal device 1700 can be configured to perform the one-step payment approval and confirmation method (e.g., the method 500 in FIG. 5) described above with respect to FIGS. 1-5. Specifically, instructions or code of the programs and/or modules stored in the memory 120, when executed at the processor 180, can perform the operations of the one-step payment approval and confirmation method as described above with respect to FIGS. 1-5.

FIG. 7 is a block diagram of an exemplary user device 700 in accordance with some embodiments. The user device 700 can be structurally and functionally similar to the user devices 122, 124, 300, 1700, shown and described above with respect to FIGS. 1, 3, and 6. As shown in FIG. 7, the user device 700 includes a display 720, a communication interface 780, a processor 730, and a memory 740. The memory 740 includes a display module 742, a detection module 744, a determining module 746, and a confirmation module 748. In some embodiments, the user device 700 can include more or less components and/or modules than those shown in FIG. 7. For example, the user device 700 can include one or more output devices such as a speaker for outputting audible messages. For another example, the user device 700 can include one or more input devices such as a keyboard, a mouse, a voice-command input unit or a microphone.

The communication interface 780 can include any type of communication interface, network interface, device or component through which the user device 700 can send data (e.g., data packets, data cells, data frames) to and/or receive data from other devices (e.g., a server device such as the server device 155 in FIG. 1) in a communication network. Such a communication interface can include, for example, a software port (e.g., a transmission control protocol (TCP) port, a user datagram protocol (UDP) port), a hardware port (e.g., a universal serial bus (USB) port, a network port), an antenna, and/or the like. In some embodiments, the communication interface 780 enables the user device 700 to be operatively coupled to and communicate with one or more other devices (e.g., a server device) using any suitable connection such as, for example, an optical connection (e.g., an optical cable and optical connectors), an electrical connection (e.g., an electrical cable and electrical connectors), a wireless connection (e.g., a wireless link and wireless signal transceivers), and/or the like. Similarly stated, in some embodiments, the communication interface 780 implements a physical layer using twisted-pair electrical signaling via electrical cables, or fiber-optic signaling via fiber-optic cables, or wireless signaling via a wireless link between two wireless signal transceivers.

The display 720 can be any type of device or component configured to display a user interface to a user (e.g., the user A or the user B in FIG. 1) operating the user device 700. Such a display can be, for example, a liquid crystal display (LCD), a light-emitting diode display (LED), a cathode ray tube (CRT) display, a plasma display panel (PDP), a touch screen display, etc. For example, the display 720 can be a touch screen LED of a smart phone. For another example, the display 720 can be a LCD monitor of a desktop computer.

The processor 730 can be any processing device capable of performing at least a portion of the online payment process described herein. Such a processor can be, for example, a CPU, a digital signal processor (DSP), a field programmable gate array (FPGA), and/or the like. The processor 730 can be configured to control the operations of other components and/or modules of the user device 700. For example, the processor 730 can be configured to control operations of the communication interface 780 and the display 720. For another example, to perform a portion of the online payment process, the processor 730 can be configured to execute instructions or code stored in a software program or module (e.g., the display module 742, the detection module 744, the determining module 746, the confirmation module 748) within the memory 740.

In some embodiments, the memory 740 can include, for example, a random-access memory (RAM) (e.g., a DRAM, a SRAM, a DDR RAM, etc.), a non-volatile memory such as one or more magnetic disk storage devices, optical disk storage devices, flash memory devices, or other non-volatile solid state storage devices. In some embodiments, the memory 740 can include one or more storage devices (e.g., a removable memory) remotely located from other components of the user device 700.

In some embodiments, each module (e.g., the display module 742, the detection module 744, the determining module 746, the confirmation module 748) included in the memory 740 can be a hardware-based module (e.g., a DSP, a FPGA), a software-based module (e.g., a module of computer code executed at a processor, a set of processor-readable instructions executed at a processor), or a combination of hardware and software modules. Instructions or code of each module can be stored in the memory 740 and executed at the processor 730. In some embodiments, the memory 740 can include more or less modules than those shown in FIG. 7.

As shown in FIG. 7, in some embodiments, the memory 740 can include a non-transitory computer readable storage medium storing the following programs, modules, and data structures, or a subset or superset thereof:

the display module 742 configured to, among other functions, display one or more user interfaces in the display 720 to the user (e.g., the user A or the user B in FIG. 1) operating the user device 700;

the detection module 744 configured to, among other functions, detect a user input (e.g., a sliding input, input data) performed on or entered via the user interface displayed on the display 720;

the determining module 746 configured to, among other functions, compare a detected user input with a predefined motion path to determine if the detected user input satisfies a predetermined criterion; and the confirmation module 748 configured to, among other functions, execute a payment operation upon a confirmation of payment data associated with that payment operation being completed.

Each of the above identified modules can be stored in the memory 740, and correspond to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 740, optionally, stores a subset of the modules identified above. Furthermore, the memory 740 can optionally store additional modules and/or data structures not described above. Details of the functions associated with the online payment process and performed by the modules are further described above with respect to FIGS. 1-6.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of providing one-step payment approval and confirmation, comprising:
   at a user device having one or more processors and memory for storing programs to be executed by the one or more processors:
   in a user interface of the user device, concurrently displaying a data entry region configured to accept user entry of payment data associated with a payment operation, and a confirmation region configured to require a sliding input that follows a predefined motion path to cause execution of the payment operation;
   receiving, in response to a user operating the data entry region of the user interface, the payment data associated with the payment operation;
   while displaying the data entry region containing the received payment data in the user interface, detecting a user input in the confirmation region of the user interface;
   determining a level of hesitation of executing the payment operation based on a motion speed of the detected user input;
   presenting information for assisting the user to make a decision about the payment operation based on the level of hesitance, wherein the information includes a coupon, a visual prompt, or an audio prompt;
   determining, in accordance with a predetermined criterion, whether the detected user input qualifies as the sliding input that follows the predefined motion path; and
   upon determining that the detected user input qualifies as the required sliding input, executing the payment operation in accordance with the received payment data.

2. A method of claim 1, further comprising:
   setting the predefined motion path based at least in part on one or more sample sliding inputs provided by the user in a configuration session for configuring the one-step payment approval and confirmation in the user interface.

3. A method of claim 1, further comprising:
   upon determining that the received payment data associated with the payment operation is incomplete, presenting a message to indicate an error associated with the payment data.

4. A method of claim 1, wherein determining, in accordance with the predetermined criterion, whether the detected user input qualifies as the sliding input that follows the predefined motion path further comprises:
   determining whether (1) a starting point of the detected user input matches a predefined starting location of the predefined motion path and (2) an end point of the detected user input matches a predefined end location of the predefined motion path.

5. A method of claim 1, wherein determining, in accordance with the predetermined criterion, whether the detected user input qualifies as the sliding input that follows the predefined motion path further comprises:
   determining whether (1) a starting point of the detected user input matches a predefined starting location of the predefined motion path, (2) an end point of the detected user input matches a predefined end location of the predefined motion path, and (3) a motion path of the detected user input matches a path of the predefined motion path.

6. A method of claim 1, wherein determining, in accordance with the predetermined criterion, whether the detected user input qualifies as the sliding input that follows the predefined motion path further comprises:
   determining whether a motion path of the detected user input matches the predefined motion path.

7. A method of claim 1, further comprising:
   upon determining that the detected user input fails to qualify as the required sliding input, presenting additional information relevant to the payment operation as decision-making assistance to the user, wherein the additional information comprises: a digital coupon for a product associated with the payment operation, or an alternative for a product associated with the payment operation.

8. A method of claim 1, further comprising:
   prior to a termination of the user input, determining whether a currently received portion of the user input has reached a predefined threshold state; and
   upon determining that the currently received portion of the user input has reached the predefined threshold state, displaying a visual prompt in the user interface indicating the required sliding input.

9. The method of claim 8, wherein the visual prompt is a proposed continuation path for completing the required sliding input.

10. The method of claim 8, further comprising:
    prior to the termination of the user input, providing concurrent visual feedback indicating the currently received portion of the user input in the user interface.

11. The method of claim 1, further comprising:
    determining whether a fraud activity exists based on a comparison between a measurement of a finger pressure of the detected user input and a predetermined range of pressure associated with a default user associated with the user device.

12. An electronic device, comprising:
    one or more processors; and
    memory storing one or more programs to be executed by the one or more processors, the one or more programs comprising instructions for:
    in a user interface of the electronic device, concurrently displaying a data entry region configured to accept user entry of payment data associated with a payment operation, and a confirmation region configured to require a sliding input that follows a predefined motion path to cause execution of the payment operation;
    receiving, in response to a user operating the data entry region of the user interface, the payment data associated with the payment operation;
    while displaying the data entry region containing the received payment data in the user interface, detecting a user input in the confirmation region of the user interface;
    determining a level of hesitation of executing the payment operation based on a motion speed of the detected user input;
    presenting information for assisting the user to make a decision about the payment operation based on the level of hesitance, wherein the information includes a coupon, a visual prompt, or an audio prompt;
    determining, in accordance with a predetermined criterion, whether the detected user input qualifies as the sliding input that follows the predefined motion path; and
    upon determining that the detected user input qualifies as the required sliding input, executing the payment operation in accordance with the received payment data.

13. The electronic device of claim 12, wherein the one or more programs further comprise instructions for:
setting the predefined motion path based at least in part on one or more sample sliding inputs provided by the user in a configuration session for configuring the user interface associated with the payment operation.

14. The electronic device of claim 12, wherein determining, in accordance with the predetermined criterion, whether the detected user input qualifies as the sliding input that follows the predefined motion path further comprises:
determining whether (1) a starting point of the detected user input matches a predefined starting location of the predefined motion path and (2) an end point of the detected user input matches a predefined end location of the predefined motion path.

15. The electronic device of claim 12, wherein determining, in accordance with the predetermined criterion, whether the detected user input qualifies as the sliding input that follows the predefined motion path further comprises:
determining whether a motion path of the detected user input matches the predefined motion path.

16. A non-transitory computer readable storage medium storing one or more programs, the one or more programs comprising instructions, which, when executed by one or more processors, cause the processors to perform operations comprising:
in a user interface of an electronic device, concurrently displaying a data entry region configured to accept user entry of payment data associated with a payment operation, and a confirmation region configured to require a sliding input that follows a predefined motion path to cause execution of the payment operation;
receiving, in response to a user operating the data entry region of the user interface, the payment data associated with the payment operation;
while displaying the data entry region containing the received payment data in the user interface, detecting a user input in the confirmation region of the user interface;
determining a level of hesitation of executing the payment operation based on a motion speed of the detected user input;
presenting information for assisting the user to make a decision about the payment operation based on the level of hesitance, wherein the information includes a coupon, a visual prompt, or an audio prompt;
determining, in accordance with a predetermined criterion, whether the detected user input qualifies as the sliding input that follows the predefined motion path; and
upon determining that the detected user input qualifies as the required sliding input, executing the payment operation in accordance with the received payment data.

17. The non-transitory computer readable storage medium of claim 16, wherein the operations further comprise:
setting the predefined motion path based at least in part on one or more sample sliding inputs provided by the user in a configuration session for configuring the user interface associated with the payment operation.

18. The non-transitory computer readable storage medium of claim 16, wherein the operations further comprise:
upon determining that the detected user input fails to qualify as the required sliding input and the received payment data associated with the payment operation is incomplete, presenting a message to indicate an error associated with the payment data.

19. The non-transitory computer readable storage medium of claim 16, wherein the perform operations further comprise:
upon determining that the detected user input fails to qualify as the required sliding input, presenting additional information relevant to the payment operation as decision-making assistance to the user, wherein the additional information comprises: a digital coupon for a product associated with the payment operation, or an alternative for a product associated with the payment operation.

* * * * *